United States Patent
Luan

(10) Patent No.: US 9,083,872 B2
(45) Date of Patent: Jul. 14, 2015

(54) IMAGING DEVICE WITH ADHESIVE FILLING OPENINGS AND RELATED METHODS

(71) Applicant: STMICROELECTRONICS (SHENZHEN) R&D CO., LTD., Nanshan, Shenzhen (CN)

(72) Inventor: Jing-En Luan, Shenzhen (CN)

(73) Assignee: STMICROELECTRONICS (SHENZHEN) R&D CO. LTD, Shenzhen (CN)

( * ) Notice: Subject to any disclaimer, the term of this patent is extended or adjusted under 35 U.S.C. 154(b) by 29 days.

(21) Appl. No.: 14/032,607

(22) Filed: Sep. 20, 2013

(65) Prior Publication Data
US 2014/0092297 A1    Apr. 3, 2014

(30) Foreign Application Priority Data
Sep. 28, 2012  (CN) .......................... 2012 1 0377434

(51) Int. Cl.
*H04N 5/225*    (2006.01)
(52) U.S. Cl.
CPC ........... *H04N 5/2254* (2013.01); *H04N 5/2257* (2013.01)
(58) Field of Classification Search
CPC .. H04N 5/2257; H04N 5/2254; H04N 5/2252
USPC .......................................... 348/335, 373, 374
See application file for complete search history.

(56) References Cited

U.S. PATENT DOCUMENTS

| | | | |
|---|---|---|---|
| 7,763,855 B2 * | 7/2010 | Hayashi et al. | 250/339.01 |
| 8,031,407 B2 | 10/2011 | Hurwitz et al. | |
| 2009/0057544 A1 | 3/2009 | Brodie et al. | |
| 2010/0148347 A1 | 6/2010 | Goh et al. | |
| 2010/0171192 A1 | 7/2010 | Hiltunen et al. | |
| 2011/0157452 A1 | 6/2011 | Goh et al. | |
| 2011/0317065 A1 * | 12/2011 | Lin et al. | 348/373 |
| 2012/0140101 A1 * | 6/2012 | Afshari et al. | 348/335 |
| 2012/0168888 A1 | 7/2012 | Luan et al. | |
| 2012/0178213 A1 | 7/2012 | Goh et al. | |
| 2014/0204476 A1 * | 7/2014 | Takase et al. | 359/738 |

OTHER PUBLICATIONS

"Stunning Images from 2 Megapixel Module," 2012, 2 pages.
"5-Mpixel AF Multi-Chip Camera Module with High-Performance ISP," 2012, 2 pages.
"VGA Thinnest, Reflowable, Camera-on-Chip," 2012, 2 pages.
"More Connected, More Secured, More Immersive," 2012, 34 pages.

* cited by examiner

*Primary Examiner* — Nhan T Tran
(74) *Attorney, Agent, or Firm* — Allen, Dyer, Doppelt, Milbrath & Gilchrist, P.A.

(57) ABSTRACT

An imaging device may include a housing, an image sensor IC in the housing, a lens adjacent the image sensor IC, and a cap over the lens and having an adhesive filling opening therein. The cap, the housing, and the lens may define an adhesive receiving cavity therein and in communication with the adhesive filling opening. The imaging device may also include adhesive material within the adhesive receiving cavity touching the cap, the housing, and the lens.

26 Claims, 4 Drawing Sheets

IMAGING DEVICE WITH ADHESIVE FILLING OPENINGS AND RELATED METHODS

FIELD OF THE INVENTION

The present invention relates to the field of semiconductor devices, and, more particularly, to an imaging device and related methods.

BACKGROUND OF THE INVENTION

Typically, electronic devices include one or more camera modules for providing enhanced media functionality. For example, the typical electronic device may utilize the camera modules for photo capturing and video teleconferencing. In the typical electronic device with multiple camera modules, the primary camera module has a high pixel density and an adjustable focus lens system while the secondary camera module is front-facing and has a lower pixel density. Also, the secondary camera module may have a fixed focus lens system.

In typical electronic devices, the secondary camera module may comprise a reflowable camera module. Although the reflowable camera module is less costly and readily installed, for example, via surface mount connectors, the reflowable camera module may be relatively fragile to assemble during manufacturing.

For example, U.S. Patent Application No. 2009/0057544 to Brodie et al, assigned to the present application's assignee, discloses a camera module for a mobile device. The camera module comprises a lens, a housing carrying the lens, and a lens cap over the lens and housing. The camera module includes a barrel mechanism for adjusting the lens.

Referring to FIGS. 1-2, a typical camera module 10 is described. For example, this camera module 10 is available from STMicroelectronics of Geneva, Switzerland as part no. VS6559. The camera module 10 includes a housing 12, a glass layer 16 in the housing, an image sensor integrated circuit (IC) 25 embedded in a through silicon via (TSV) substrate 27 below the glass layer, a plurality of lenses 14-15 stacked together in the housing, and a plurality of spacers 17-18 adjacent the lenses and the glass layer. The camera module 10 includes a cap 11 over the lenses 14-15, and a plurality of adhesive joints 19-21 for securing adjacent components in the camera module 10. The reflowable camera module 10 includes a plurality of bump contacts 22a-22d on a backside of the TSV substrate 27. Typically during manufacture, the camera module 10 is stacked in sandwich like manner. During these stacking steps, the adhesive joints 19-21 are formed. A potential drawback to this approach of manufacture is that the layers of the stack can be detached if there is a weak adhesive joint.

SUMMARY OF THE INVENTION

An imaging device may comprise a housing, an image sensor integrated circuit (IC) in the housing, at least one lens adjacent the image sensor IC, and a cap over the at least one lens and having at least one adhesive filling opening therein. The cap, the housing, and the at least one lens may define at least one adhesive receiving cavity therein and in communication with the at least one adhesive filling opening. The imaging device may also include adhesive material within the at least one adhesive receiving cavity and touching the cap, the housing, and the at least one lens. Advantageously, the imaging device is mechanically robust.

In some embodiments, the cap may have a rectangular shape defining four corners, and the at least one adhesive filling opening comprises a respective adhesive filling opening at each corner of the cap. The at least one adhesive receiving cavity may comprise a respective adhesive receiving cavity adjacent each corner of the cap. In some embodiments, the cap may have an asymmetrical shape. In other embodiments, the cap may have a symmetrical shape.

More specifically, the imaging device may further comprise a spacer between the image sensor IC and the at least one lens. The imaging device may also comprise at least one adhesive joint between the image sensor IC and the spacer. The at least one lens may comprise a plurality thereof, and the imaging device may further comprise a spacer between adjacent lenses.

Additionally, the imaging device may further comprise an interconnect glass substrate over the image sensor IC and adjacent portions of the housing. The imaging device may further comprise at least one adhesive joint between the interconnect glass substrate and the adjacent portions of the housing. The cap may have an aperture therein aligned with the at least one lens.

Another aspect is directed to a method of making an imaging device. The method may comprise positioning an image sensor IC in a housing, and positioning at least one lens adjacent the image sensor IC. The method may include positioning a cap over the at least one lens and having at least one adhesive filling opening therein, the cap, the housing, and the at least one lens defining at least one adhesive receiving cavity therein and in communication with the at least one adhesive filling opening. The method also may include positioning adhesive material within the at least one adhesive receiving cavity and touching the cap, the housing, and the at least one lens.

DETAILED DESCRIPTION OF THE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
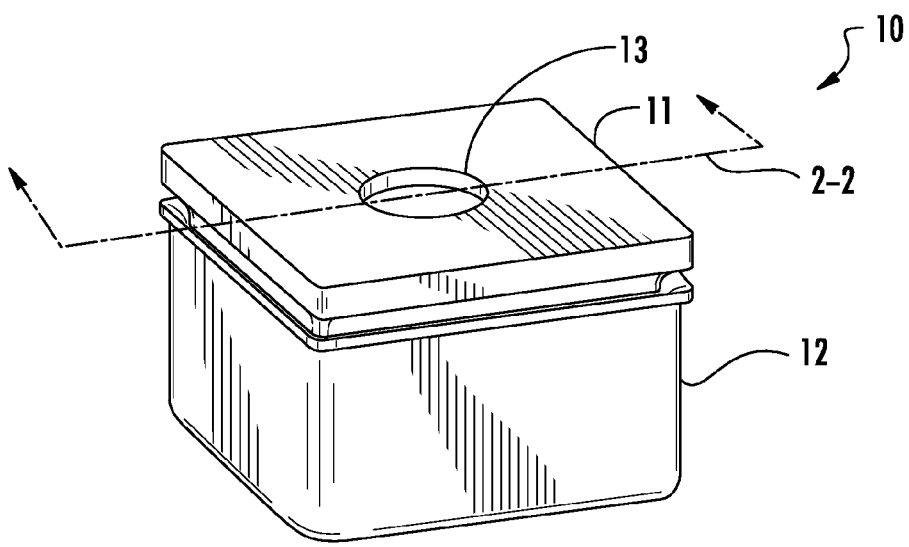
FIG. 1 is a perspective view of an imaging device, according to the prior art.
Figure 2:
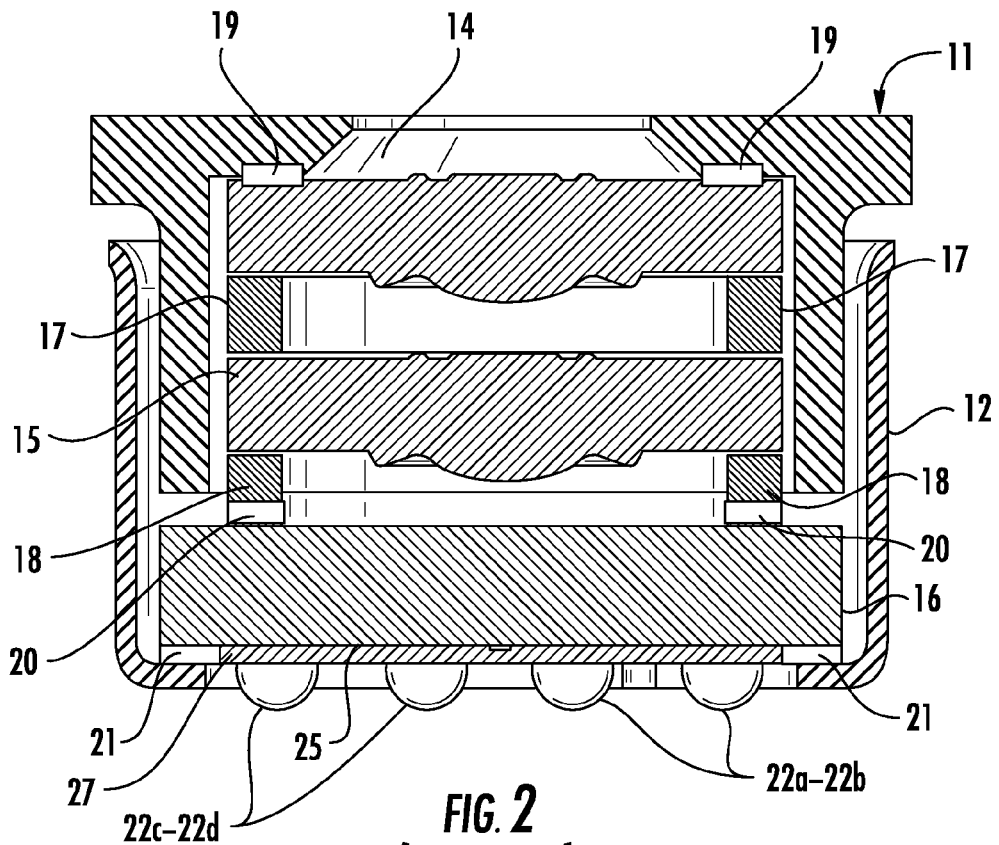
FIG. 2 is a cross-section view of the imaging device of FIG. 1 along line 2-2.
Figure 3:
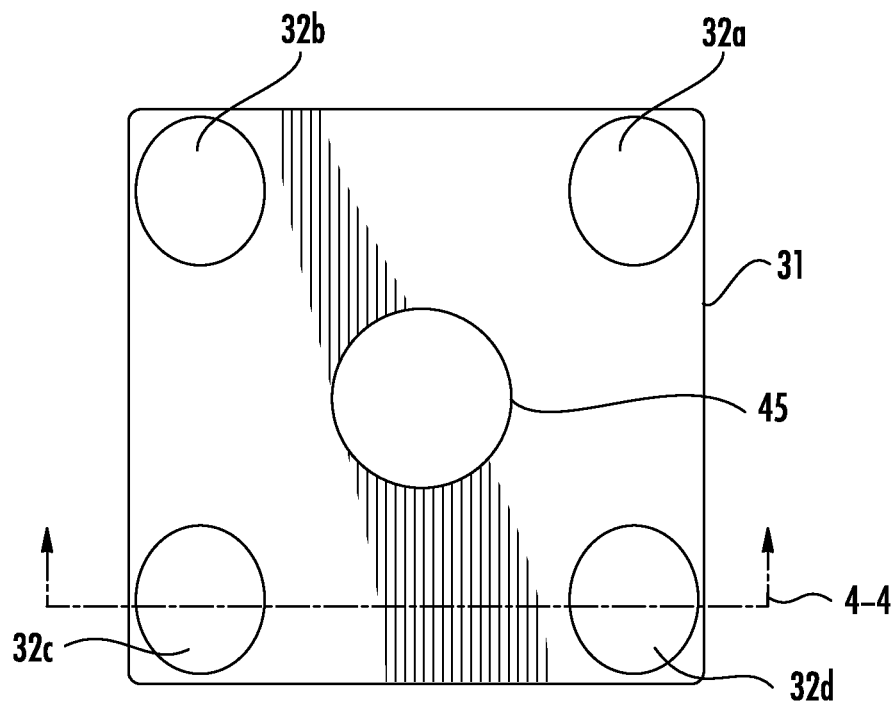
FIG. 3 is a top plan view of an imaging device, according to the present disclosure.
Figure 4A:
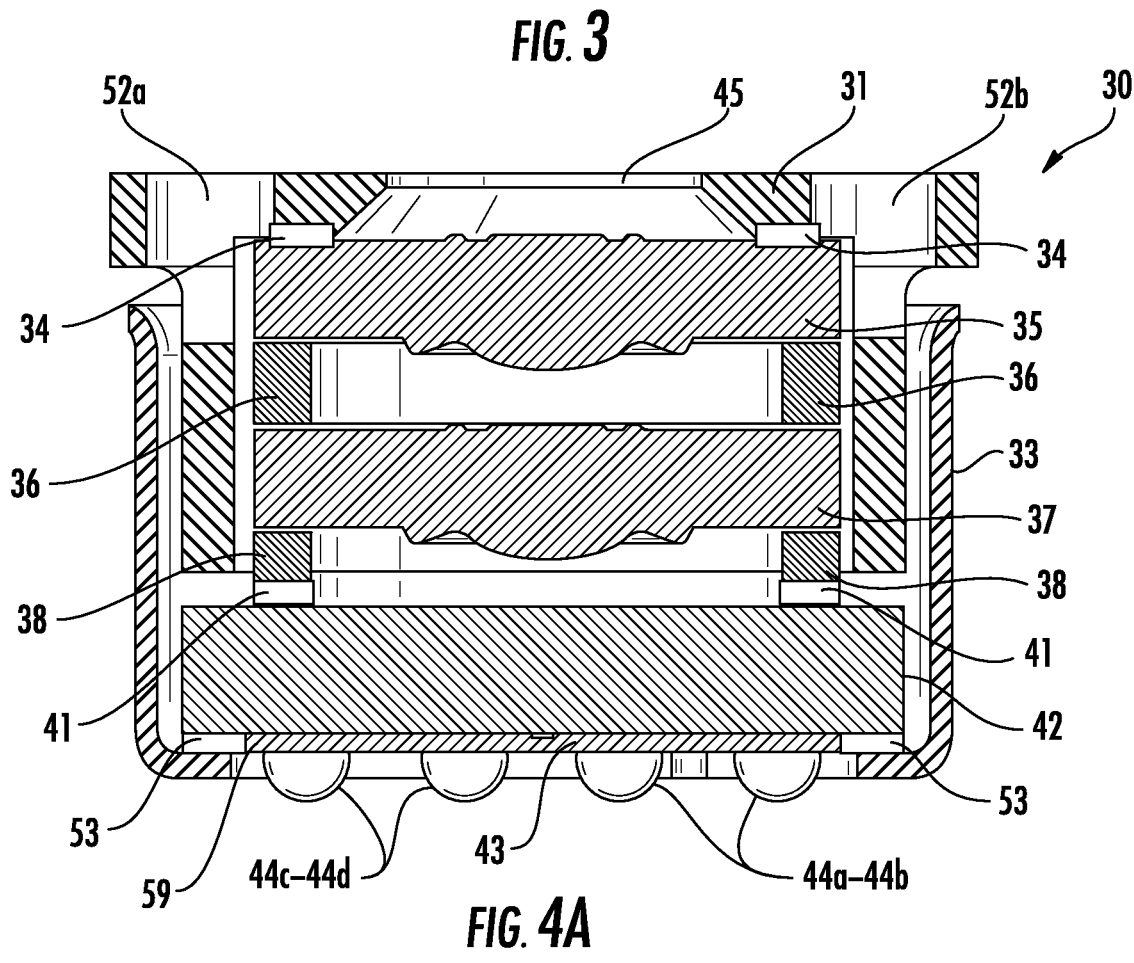
FIG. 4A is a cross-section view of the imaging device of FIG. 3 along line 4-4.

Referring initially to FIGS. 3-4A, an imaging device 30 according to the present disclosure is now described. The imaging device 30 illustratively includes a housing 33, an image sensor IC 43 in the housing, a plurality of lenses 35, 37 adjacent the image sensor IC, and a cap 31 over the lenses and having a plurality of adhesive filling openings 32a-32d therein. The housing 33 may comprise a metallic housing. The imaging device 30 illustratively includes a TSV substrate 59 carried by the housing 33, and the image sensor IC 43 may be embedded in the TSV substrate.

The cap 31, the housing 33, and the lenses 35, 37 may define a plurality of adhesive receiving cavities 52a-52b therein and in communication with the adhesive filling openings 32a-32d. Although only two adhesive receiving cavities 52a-52b are depicted, it should be appreciated that the illustrated imaging device 30 includes a total of four adhesive receiving cavities at respective corners of the cap 31.

In the illustrated embodiment, the cap 31 has a rectangular shape defining four corners, and the adhesive filling openings 32a-32d are located at each corner of the cap. Of course in other embodiments, the cap 31 may take other shapes. The adhesive receiving cavities 52a-52b are adjacent each corner of the cap 31 and protrude down past the uppermost lens 35 in the stacked arrangement of the imaging device 30. In the illustrated embodiment, the cap 31 has a symmetrical shape.

More specifically, the imaging device 30 illustratively includes a spacer 38 between the image sensor IC 43 and the adjacent lens 37, and an adhesive joint 41 between the image sensor IC and the spacer. The imaging device 30 illustratively includes a spacer 36 between adjacent lenses. Additionally, the imaging device 30 illustratively includes an interconnect glass substrate 42 over the image sensor IC 43 and adjacent portions of the housing 33. The imaging device 30 illustratively includes an adhesive joint 53 between the interconnect glass substrate 42 and the adjacent portions of the housing 33. The cap 31 illustratively includes an aperture 45 therein aligned with the lenses 35, 37. As will be appreciated by those skilled in the art, incident light (imaging data) is captured through the aperture 45 and collimated via the lenses 35, 37 and directed to the image sensor IC 43.

Additionally, the imaging device 30 illustratively includes a plurality of bump contacts 44a-44b on the opposing side of the interconnect glass substrate 42. The housing 33 illustratively includes an opening on the bottom thereof for providing access to the plurality of bump contacts 44a-44b.

Figure 4B:
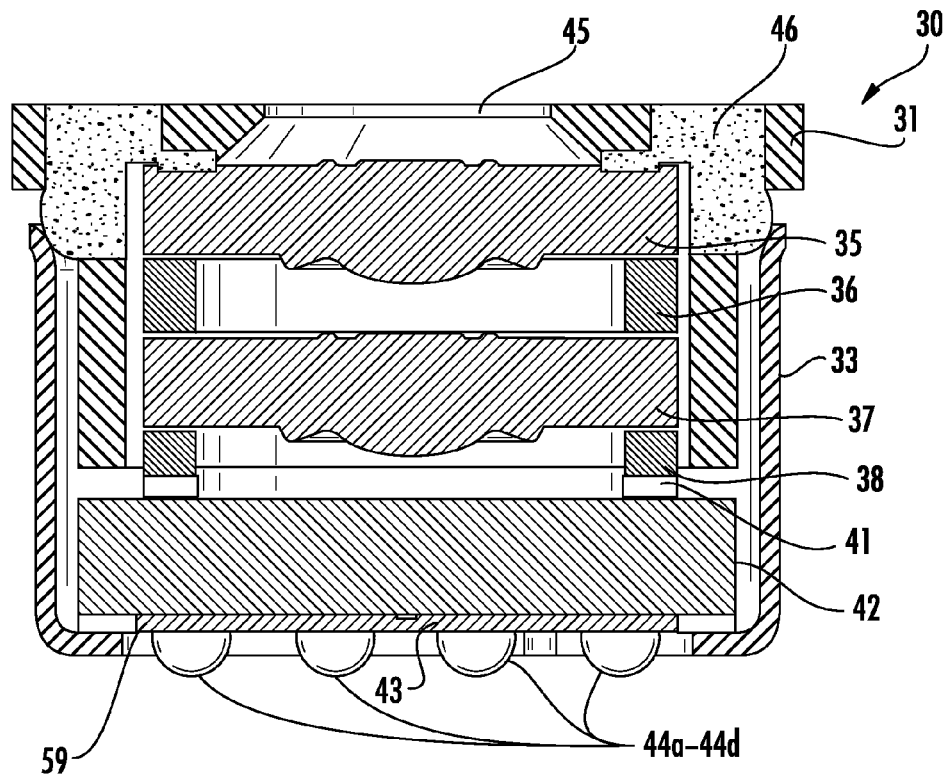
FIG. 4B is a cross-section view of the imaging device of FIG. 3 along line 4-4 with the adhesive material therein.

Referring now additionally to FIG. 4B, during manufacture, the layers of the imaging device 30 are stacked on top of each other to provide the imaging device as depicted in FIG. 4A. Thereafter, adhesive material is disposed in the plurality of adhesive receiving cavities 52a-52b so that the imaging device 30 may include adhesive material 46 therein touching and to thereby secure the cap 31, the housing 33, and the lens 35, 37 together. In the illustrated embodiment, the adhesive material 46 fills the adhesive receiving cavities 52a-52b, but in other embodiments, the adhesive receiving cavities may not be entirely filled, i.e. partially filled. Advantageously, the imaging device 30 may be more mechanically resilient than the typical camera module. Moreover, the imaging device 30 can be manufactured without significant changes to the typical process flow, reducing cost of implementation.

Another aspect is directed to a method of making an imaging device 30. The method may comprise providing a housing 33, positioning an image sensor IC 43 in the housing, and positioning at least one lens 35, 37 adjacent the image sensor IC. The method may include positioning a cap 31 over the at least one lens 35, 37 and having at least one adhesive filling opening 32a-32d therein, the cap, the housing 33, and the at least one lens defining at least one adhesive receiving cavity 52a-52b therein and in communication with the at least one adhesive filling opening. The method also may include forming adhesive material 46 within the at least one adhesive receiving cavity 52a-52b and touching and thereby securing the cap 31, the housing 33, and the at least one lens 35, 37.

Figures 5, 6:
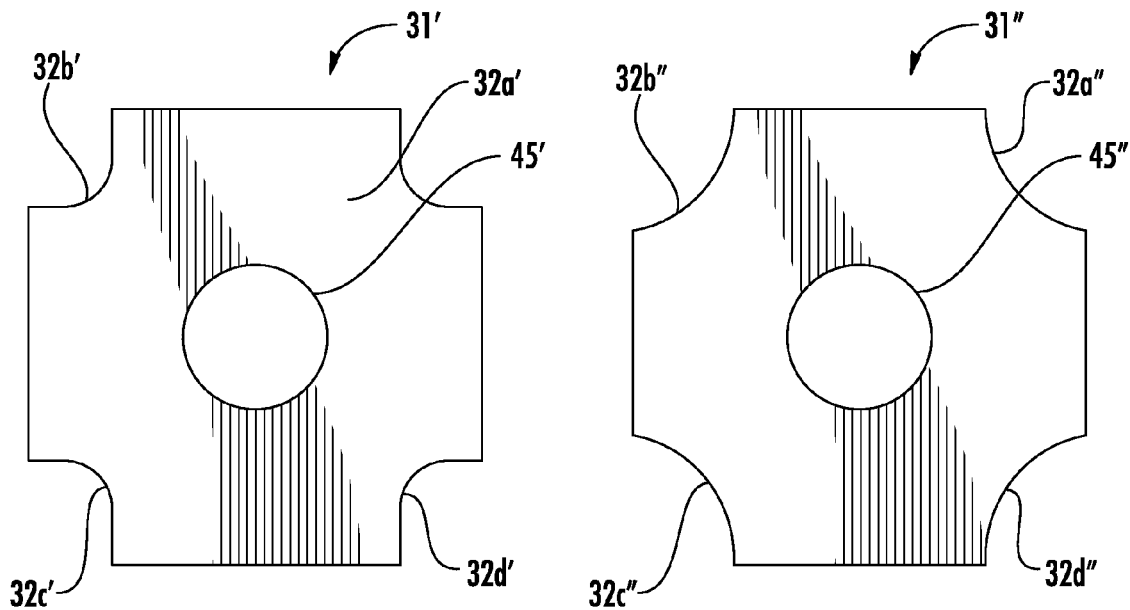
FIGS. 5-8 are top plan views of other embodiments of the cap from the imaging device of FIG. 3.

Referring now to FIG. 5, another embodiment of the cap 31' is now described. In this embodiment of the cap 31', those elements already discussed above with respect to FIGS. 3-4B are given prime notation and most require no further discussion herein. This embodiment differs from the previous embodiment in that the cap 31' further includes a plurality of adhesive filling openings 32a'-32d' that define the outer peripheral edge of the cap. In other words, the adhesive filling openings 32a'-32d' comprise corner notches/recesses.

Referring now to FIG. 6, another embodiment of the cap 31" is now described. In this embodiment of the cap 31", those elements already discussed above with respect to FIGS. 3-4B are given double prime notation and most require no further discussion herein. This embodiment differs from the previous embodiment in that the cap 31" further includes a plurality of adhesive filling openings 32a"-32d" that define the outer peripheral edge of the cap. Moreover, the plurality of adhesive filling openings 32a"-32d" are greater in size than those in the embodiment of FIG. 5.

Figure 7:
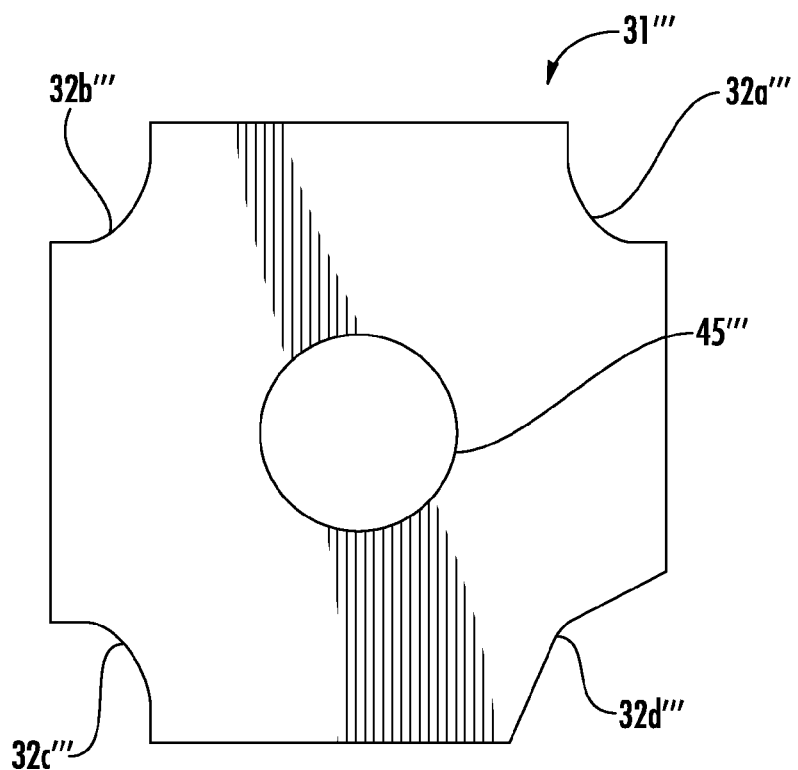

Referring now to FIG. 7, another embodiment of the cap 31''' is now described. In this embodiment of the cap 31''', those elements already discussed above with respect to FIGS. 3-4B are given triple prime notation and most require no further discussion herein. This embodiment differs from the previous embodiment in that the cap 31''' further includes a plurality of adhesive filling openings 32a'''-32d''' that define the outer peripheral edge of the cap. In this embodiment, the cap 31''' illustratively has an asymmetrical shape. In particular, one adhesive filling opening 32d''' has an oblique triangle shape. Advantageously, the asymmetrical shape of the cap 31''' may provide a method for manufacturing machinery to determine an orientation of the cap 31''' during steps of manufacture.

Figure 8:
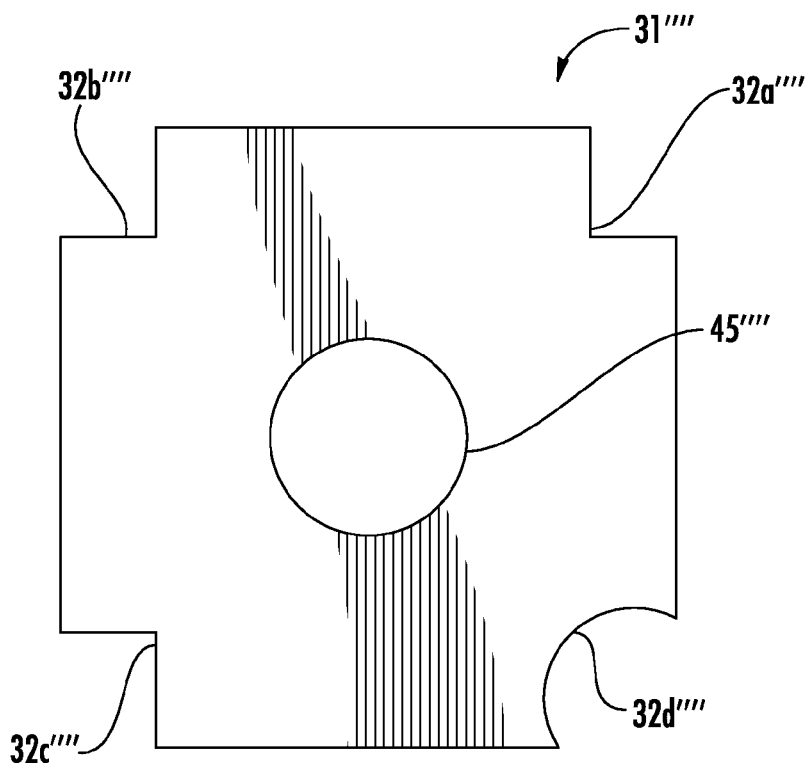

Referring now to FIG. 8, another embodiment of the cap 31'''' is now described. In this embodiment of the cap 31'''', those elements already discussed above with respect to FIGS. 3-4B are given quadruple prime notation and most require no further discussion herein. This embodiment differs from the previous embodiment in that the cap 31'''' further includes a plurality of adhesive filling openings 32a''''-32d'''' that define the outer peripheral edge of the cap. In this embodiment, the cap 31'''' illustratively has an asymmetrical shape. In particular, one adhesive filling opening 32d'''' is circle shaped while the other openings 32a''''-32b'''' are rectangular shaped.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An imaging device comprising:
a housing;
an image sensor integrated circuit (IC) in said housing;
at least one lens adjacent to said image sensor IC;
a cap separate from said housing and being over said at least one lens and having at least one adhesive filling opening therein;
said cap, said housing, and said at least one lens defining at least one adhesive receiving cavity therein and in communication with the at least one adhesive filling opening; and adhesive material within the at least one adhesive receiving cavity and touching said cap, said housing, and said at least one lens.

2. The imaging device of claim 1 wherein said cap has a rectangular shape defining four corners; wherein the at least one adhesive filling opening comprises a respective adhesive filling opening at each corner of said cap; and wherein the at least one adhesive receiving cavity comprises a respective adhesive receiving cavity adjacent each corner of said cap.

3. The imaging device of claim 1 wherein said cap has an asymmetrical shape.

4. The imaging device of claim 1 wherein said cap has a symmetrical shape.

5. The imaging device of claim 1 further comprising a spacer between said image sensor IC and said at least one lens.

6. The imaging device of claim 5 further comprising at least one adhesive joint between said image sensor IC and said spacer.

7. The imaging device of claim 1 wherein said at least one lens comprises a plurality thereof; and further comprising a spacer between adjacent lenses.

8. The imaging device of claim 1 further comprising an interconnect glass substrate over said image sensor IC and adjacent portions of said housing.

9. The imaging device of claim 8 further comprising at least one adhesive joint between said interconnect glass substrate and the adjacent portions of said housing.

10. The imaging device of claim 1 wherein said cap has an aperture therein aligned with said at least one lens.

11. An imaging device comprising:
a housing;
an image sensor integrated circuit (IC) in said housing;
at least one lens adjacent said image sensor IC;
a spacer between said image sensor IC and said at least one lens;
a rectangular shaped cap being separate from said housing, defining four corners, being over said at least one lens, and having a plurality of adhesive filling openings respectively at each corner thereof;
said rectangular shaped cap, said housing, and said at least one lens defining a plurality of adhesive receiving cavities therein and in communication respectively with said plurality of adhesive filling openings and also being adjacent each corner of said rectangular shaped cap; and
adhesive material within said plurality of adhesive receiving cavities and touching said rectangular shaped cap, said housing, and said at least one lens.

12. The imaging device of claim 11 wherein said rectangular shaped cap has an asymmetrical shape.

13. The imaging device of claim 11 wherein said rectangular shaped cap has a symmetrical shape.

14. The imaging device of claim 11 further comprising at least one adhesive joint between said image sensor IC and said spacer.

15. The imaging device of claim 11 wherein said at least one lens comprises a plurality thereof; and further comprising an other spacer between adjacent lenses.

16. The imaging device of claim 11 further comprising an interconnect glass substrate over said image sensor IC and adjacent portions of said housing.

17. A method of making an imaging device comprising:
positioning an image sensor integrated circuit (IC) in a housing;
positioning at least one lens adjacent the image sensor IC;
positioning a cap separate from the housing to be over the at least one lens, the cap having at least one adhesive filling opening therein;
the cap, the housing, and the at least one lens defining at least one adhesive receiving cavity therein and in communication with the at least one adhesive filling opening; and
positioning adhesive material within the at least one adhesive receiving cavity and touching the cap, the housing, and the at least one lens.

18. The method of claim 17 wherein the cap has a rectangular shape defining four corners; wherein the at least one adhesive filling opening comprises a respective adhesive filling opening at each corner of the cap; and wherein the at least one adhesive receiving cavity comprises a respective adhesive receiving cavity adjacent each corner of the cap.

19. The method of claim 17 wherein the cap has an asymmetrical shape.

20. The method of claim 17 wherein the cap has a symmetrical shape.

21. The method of claim 17 further comprising positioning a spacer between the image sensor IC and the at least one lens.

22. The method of claim 21 further comprising forming at least one adhesive joint between the image sensor IC and the spacer.

23. The method of claim 17 wherein the at least one lens comprises a plurality thereof; and further comprising positioning a spacer between adjacent lenses.

24. The method of claim 17 further comprising positioning an interconnect glass substrate over the image sensor IC and adjacent portions of the housing.

25. The method of claim 24 further comprising forming at least one adhesive joint between the interconnect glass substrate and the adjacent portions of the housing.

26. The method of claim 17 wherein the cap has an aperture therein aligned with the at least one lens.

\* \* \* \* \*